US007515657B1

United States Patent
Lee et al.

(10) Patent No.: US 7,515,657 B1
(45) Date of Patent: Apr. 7, 2009

(54) FREQUENCY TRACKING FOR OFDM TRANSMISSION OVER FREQUENCY SELECTIVE CHANNELS

(75) Inventors: Jungwon Lee, Stanford, CA (US); Hui-Ling Lou, Palo Alto, CA (US); Dimitrios-Alexandros Toumpakaris, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 715 days.

(21) Appl. No.: 10/985,860

(22) Filed: Nov. 10, 2004

Related U.S. Application Data

(60) Provisional application No. 60/550,666, filed on Mar. 5, 2004, provisional application No. 60/585,961, filed on Jul. 6, 2004.

(51) Int. Cl.
*H04L 27/00* (2006.01)
*H04L 27/06* (2006.01)

(52) U.S. Cl. .................... 375/326; 375/316; 375/324; 375/344

(58) Field of Classification Search ............... 375/260, 375/316, 354, 326, 324, 344
See application file for complete search history.

(56) References Cited

U.S. PATENT DOCUMENTS

| | | | | |
|---|---|---|---|---|
| 6,373,861 B1* | 4/2002 | Lee | ........................... | 370/503 |
| 6,459,679 B1* | 10/2002 | Kim | ........................... | 370/208 |
| 6,470,030 B1* | 10/2002 | Park et al. | ........................... | 370/480 |
| 6,618,452 B1* | 9/2003 | Huber et al. | ........................... | 375/343 |
| 6,862,297 B1* | 3/2005 | Gardner et al. | ........................... | 370/503 |
| 6,993,094 B1* | 1/2006 | Eberlein et al. | ........................... | 375/326 |
| 7,009,932 B2* | 3/2006 | Matheus et al. | ........................... | 370/208 |
| 7,012,881 B2* | 3/2006 | Kim | ........................... | 370/208 |
| 7,027,543 B1* | 4/2006 | Lashkarian | ........................... | 375/355 |
| 7,046,744 B2* | 5/2006 | Ho et al. | ........................... | 375/340 |
| 7,173,979 B1* | 2/2007 | Badri et al. | ........................... | 375/308 |
| 7,200,185 B2* | 4/2007 | Thesling et al. | ........................... | 375/316 |
| 7,313,085 B2* | 12/2007 | Kim | ........................... | 370/208 |
| 2002/0145971 A1* | 10/2002 | Cho et al. | ........................... | 370/208 |
| 2002/0146078 A1* | 10/2002 | Gorokhov et al. | ........................... | 375/260 |
| 2002/0186799 A1* | 12/2002 | Sayeed | ........................... | 375/345 |
| 2004/0004933 A1* | 1/2004 | Zhu et al. | ........................... | 370/203 |
| 2004/0156441 A1* | 8/2004 | Peeters et al. | ........................... | 375/260 |
| 2005/0084025 A1* | 4/2005 | Chen | ........................... | 375/260 |
| 2005/0100106 A1* | 5/2005 | Chen | ........................... | 375/260 |
| 2005/0141460 A9* | 6/2005 | Currivan et al. | ........................... | 370/335 |
| 2006/0146962 A1* | 7/2006 | Troya et al. | ........................... | 375/340 |
| 2007/0133386 A1* | 6/2007 | Kim et al. | ........................... | 370/203 |

OTHER PUBLICATIONS

M. Morelli, A. N. D'Andrea, and Mengali, "Frequency Ambiguity Resolution in OFDM Systems," IEEE Commun. Lett., vol. 4, pp. 134-136.

(Continued)

*Primary Examiner*—Chieh M Fan
*Assistant Examiner*—Jason M. Perilla

(57) ABSTRACT

A system comprises a receiver module that generates a receiver carrier frequency and that demodulates an orthogonal frequency division multiplexing (OFDM) signal using the receiver carrier frequency. A CFO estimator module communicates with the receiver module and generates a carrier frequency offset (CFO) estimate using an M-th power method and normalizing a magnitude thereof. Another CFO estimator module communicates with the receiver module and generates a carrier frequency offset (CFO) of the OFDM signal using an M-th power method and normalizing a magnitude thereof. The CFO estimator module may be blind. The OFDM signal may also contain pilot subcarriers. The pilot subcarriers may contain known pilot symbols.

73 Claims, 8 Drawing Sheets

OTHER PUBLICATIONS

J. R. Barry, D. G. Messerschmitt, and E. A. Lee, Digital Communication, 3rd ed. Norwell:Kluwer Academic Publishers, 2003, pp. 728-738.

Goldsmith et al. "Adaptive Coded Modulation for Fading Channels," IEEE Transactions on Communications, vol. 46, No. 5, May 1998, pp. 595-602.

Goldsmith et al. "Variable -Rate Variable-Power MQAM for Fading Channels," IEEE Transactions on Communications, vol. 45, No. 10, Oct. 1997, pp. 1218-1230.

Tang et al. "Effect of Channel Estimation Error on M-QAM BER Performance in Rayleigh Fading," IEEE Transactions on Communications, vol. 47, No. 12, Dec. 1999, pp. 1856-1864.

Van de Beek et al. "ML Estimation of Time and Frequency Offset in OFDM Systems," IEEE Transactions on Signal Processing, vol. 45, No. 7, Jul. 1997, pp.1880-1805.

J.A.C. Bingham, "Multicarrier Modulation for Data Transmission: An Idea Who's Time Has Come," IEEE Commun. Mag., vol. 28, May 1990, pp. 5-14.

R. Need and R. Prasad, "OFDM for Wireless Multimedia Communications" Norwell, MA: Artech House, 2000.

W. Zhou and Y. Wu, "COFDM: An Overview," IEEE Trans. Broadcast, vol. 41, Mar. 1995, pp. 1-8.

T. Pollet, M. Van Bladel, and M. Moeneclaey, "BER Sensitivity of OFDM Systems to Carrier Frequency Offset and Wiener Phase Noise," IEEE Trans. Commun., vol. 43, Feb./Mar./Apr. 1995, pp. 191-193.

T. Schmidl and D.C. Cox, "Robust Frequency and Timing Synchronization for OFDM," IEEE Trans. Commun., vol. 45, Dec. 1997, 1613-1621.

H. Nikookar and R. Prasad, "On the Sensitivity of Multicarrier Transmission Over Multipath Channels to Phase Noise and Frequency Offsets," in Proc. IEEE GLOBECOM'96, Nov. 1996, pp. 68-72.

W. Hwang, H. Kang, and K. Kim, "Approximation of SNR Degradation Due to Carrier Frequency Offset for OFDM in Shadowed Multipath Channels," IEEE Commun. Letters, vol. 7, Dec. 2003, pp. 581-583.

T. Rappaport, Wireless Communications. Upper Saddle River, NJ: Prentice-Hall, 1996, pp. 143-153.

K. Sathananthan and C. Tellambura, "Probability of Error Calcualtion of OFDM Systems with Frequency Offset," IEEE, Trans. Commun., vol. 449, Nov. 2001, pp. 1884-1888.

P. Billingsley, Probability and Measure, 3rd ed. New York: Wiley Interscience, 1995, pp. 357-370.

J.G. Proakis, Digital Communications, 4th ed. New York: McGraw-Hill, 2000, pp. 269-282.

P.H. Moose, "A Technique for Orthogonal Frequency Division Multiplexing Frequency Offset Correction," IEEE Trans. Commun., vol. 42, Oct. 1994, pp. 2908-2914.

F. Classen and H. Meyr, "Frequency Synchronization Algorithms for OFDM Systems Suitable for Communication Over Frequency Selective Fading Channels," in Proc. IEEE 44th Veh. Technol. Conf., 1994, pp. 1655-1659.

N. Lashkarian and S. Kiaei, "Class of Cyclic-based Estimators for Frequency-offset Estimation of OFDM Systems," IEEE Trans. Commun., vol. 48, Dec. 2000 pp. 2139-2149.

U.S. Appl. No. to be Assigned, filed Nov. 10, 2004, entitled, "Adaptive OFDM Receiver Based on Carier Frequency Offset".

U.S. Appl. No. to be Assigned, filed Nov. 10, 2004, entitled, "Adaptive OFDM Transmitter Based on Carier Frequency Offset".

U.S. Appl. No. to be Assigned, filed Nov. 10, 2004, entitled, "Carrier Frequency Offset Estimation for OFDM Systems".

* cited by examiner

FREQUENCY TRACKING FOR OFDM TRANSMISSION OVER FREQUENCY SELECTIVE CHANNELS

CROSS-REFERENCE TO RELATED APPLICATIONS

This application claims the benefit of U.S. Provisional Application Nos. 60/550,666, filed on Mar. 5, 2004 and 60/585,961, filed on Jul. 6, 2004. This application relates to Ser. No. 10/986,082 filed on Nov. 10, 2004, Ser. No. 10/986,110, filed on Nov. 10, 2004 and Ser. No. 10/986,130 filed on Nov. 10, 2004. The disclosures of the above applications are incorporated herein by reference.

FIELD OF THE INVENTION

The present invention relates to receivers, and more particularly to orthogonal frequency division multiplexing (OFDM) receivers.

BACKGROUND OF THE INVENTION

Orthogonal frequency division multiplexing (OFDM) has been used in both wired and wireless communication systems because of its simple implementation and effectiveness in combating inter-symbol interference (ISI). However, OFDM is susceptible to carrier frequency offset (CFO). Even small frequency offsets can cause large signal-to-noise ratio (SNR) and bit-error-rate (BER) degradation. In particular, OFDM systems employing time-domain differential demodulation are very sensitive to the CFO. Therefore, an accurate CFO estimation and correction algorithms should be employed to avoid performance degradation.

The frequency synchronization process can usually be split into an acquisition phase and a tracking phase. The CFO is estimated coarsely and quickly during an acquisition phase, and then a residual or small CFO is estimated more accurately during a tracking phase.

Various CFO correction algorithms have been proposed for OFDM systems. In one approach, a cyclic prefix-based (CPB) algorithm was proposed. The CPB algorithm does not require training symbols or pilot tones. However, the CPB algorithm does not perform well in frequency selective channels since it was designed for an additive white Gaussian noise (AWGN) channel. On the other hand, a pilot tone-aided (PTA) algorithm can estimate the CFO more accurately in frequency selective channels. However, the PTA algorithm requires pilot subcarriers embedded among the data subcarriers, which reduces available bandwidth.

SUMMARY OF THE INVENTION

A system comprises a receiver module that generates a receiver carrier frequency and that demodulates an orthogonal frequency division multiplexing (OFDM) signal using the receiver carrier frequency. A blind CFO estimator module communicates with the receiver module and generates a carrier frequency offset (CFO) estimate of said OFDM signal using an M-th power method and normalizing a magnitude of said CFO estimate.

In some implementations, the CFO estimator module generates said CFO estimate based on $$\hat{\varepsilon} = \frac{1}{2\pi M(1+\alpha)} \angle \left( \sum_{k=0}^{N-1} \frac{(Y^*_{m-1}[k]Y_m[k])^M}{|Y^*_{m-1}[k]Y_m[k]|^\lambda} \right),$$

wherein M is the number of phases, $\lambda$ is a normalizing power, N is the number of data samples, $\alpha$ is a ratio of the number of cyclic prefix samples divided by N, m is a symbol index, and $Y_{m-1}^*[k]Y_m[k]$ are adjacent received symbols.

In some implementations, the receiver module operates in a frequency-selective channel, an additive white Gaussian noise (AWGN) channel or a multi-path fading channel. The receiver module is a wireless or wired receiver. The receiver module performs demodulation using amplitude phase shift keying (APSK) or M-ary phase shift keying (MPSK). The OFDM signal contains pilot subcarriers. The pilot subcarriers contain known pilot symbols.

In some implementations, the estimator module generates a first CFO estimate estimate $\hat{\varepsilon}_1$, multiplies a time domain signal by $e^{-j2\pi\hat{\varepsilon}_1 n/N}$ to generate an adjusted time domain signal, and uses the adjusted time domain signal to generate a second CFO estimate $\hat{\varepsilon}_2$.

The estimator module multiplies the adjusted time domain signal by $e^{-j2\pi\hat{\varepsilon}_2 n/N}$ to generate a second adjusted time domain signal, and uses the second adjusted time domain signal to generate a third CFO estimate $\hat{\varepsilon}_3$.

A system comprises a receiver module that generates a receiver carrier frequency and that demodulates an orthogonal frequency division multiplexing (OFDM) signal using the receiver carrier frequency. A CFO estimator module communicates with the receiver module and generates a carrier frequency offset (CFO) estimate of said OFDM signal using an M-th power method and normalizing a magnitude of said CFO estimate. The OFDM signal contains pilot subcarriers.

In some implementations, the CFO estimator module generates said CFO estimate based on:

$$\hat{\varepsilon} = \frac{1}{2\pi M(1+\alpha)} \left( \sum_{k \in D} \frac{(Y_{m-1}^*[k]Y_m[k])^M}{|Y_{m-1}^*[k]Y_m[k]|^\lambda} + \frac{\left(\sum_{k \in P} X_{m-1}[k]X_m^*[k]Y_{m-1}^*[k]Y_m[k]\right)^M}{\left|\sum_{k \in P} X_{m-1}[k]X_m^*[k]Y_{m-1}^*[k]Y_m[k]\right|^\lambda} \right)$$

wherein M is the number of phases, λ is a normalizing power, N is the number of data samples, α is a ratio of the number of cyclic prefix samples divided by N, m is a symbol index, $Y_{m-1}^*[k]Y_m[k]$ are adjacent received symbols and $X_{m-1}^*[k]X_m[k]$ are pilot subcarriers.

In some implementations, the receiver module operates in a frequency-selective channel, an additive white Gaussian noise (AWGN) channel, or a multi-path fading channel. The receiver module is a wireless or wired receiver. The receiver module performs demodulation using amplitude phase shift keying (APSK) or M-ary phase shift keying (MPSK). The pilot subcarriers contain known pilot symbols.

In some implementations, the estimator module generates a first CFO estimate $\hat{\varepsilon}_{-1}$, multiplies a time domain signal by $$e^{-j2\pi\hat{\varepsilon}_{-1}n/N}$$

to generate an adjusted time domain signal, and uses the adjusted time domain signal to generate a second CFO estimate estimate $\hat{\varepsilon}_{-2}$.

The estimator module multiplies the adjusted time domain signal by $$e^{-j2\pi\hat{\varepsilon}_{-2}n/N}$$

to generate a second adjusted time domain signal, and uses the second adjusted time domain signal to generate a third CFO estimate estimate $\hat{\varepsilon}_{-3}$.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
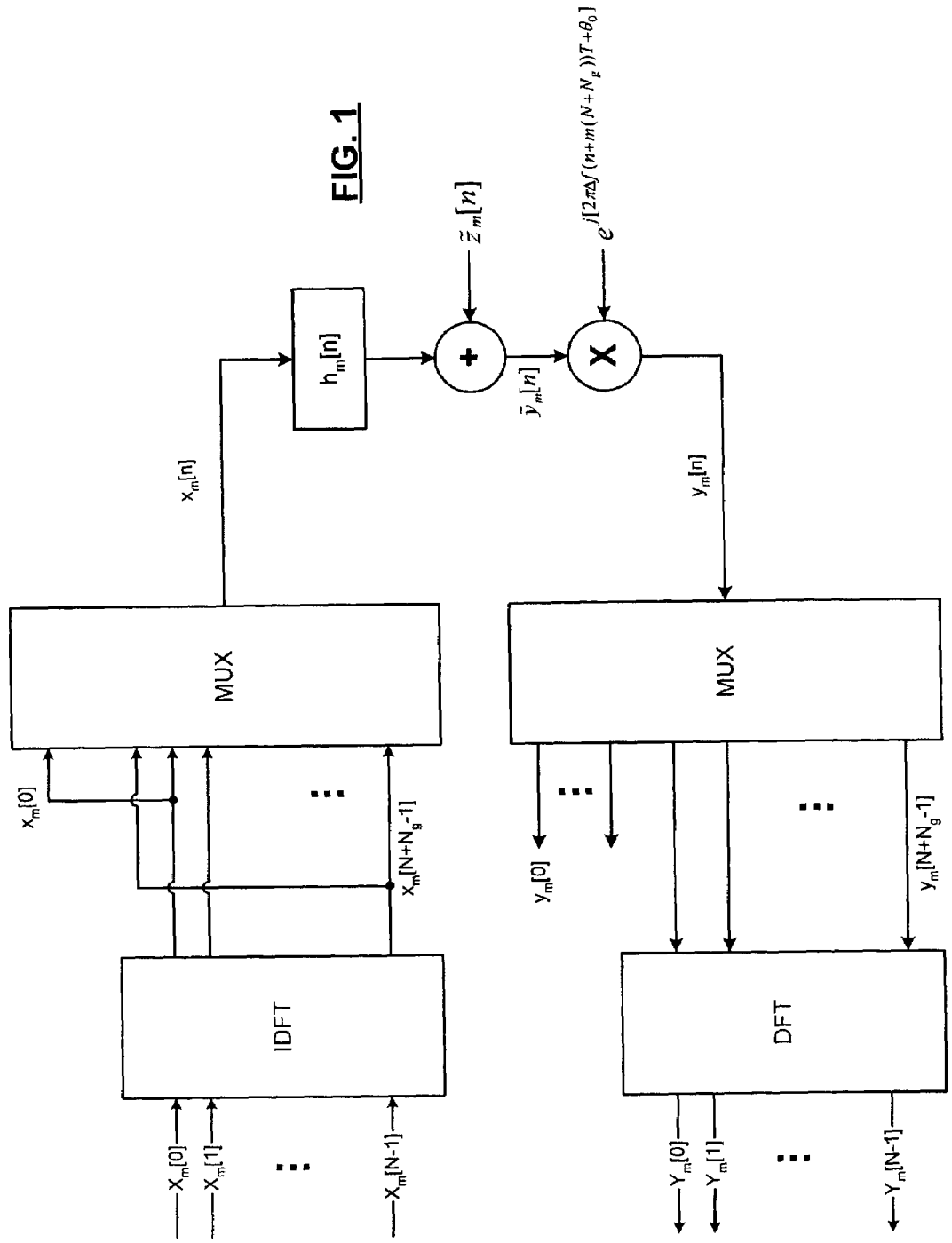
FIG. 1 is a functional block diagram of a baseband equivalent model of an OFDM system with carrier frequency offset (CFO)

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

The present invention relates to carrier frequency offset (CFO) estimation for OFDM systems. CFO estimation according to the present invention provides improved performance as compared to conventional CFO estimation algorithms. For example, cyclic prefix-based (CPB) estimators are blind but do not perform well in frequency selective channels. Pilot tone-aided (PTA) estimators perform well in frequency selective channels but require pilot subcarriers.

Unlike the CPB and PTA estimators, the CFO estimator according to the present invention does not require training symbols or pilot subcarriers and performs well in frequency selective channels.

An OFDM system transmits information as a series of OFDM symbols. Referring now to FIG. 1, a baseband equivalent model of an OFDM system is shown. As is shown in FIG. 1, the inverse discrete Fourier transform (IDFT) is performed on the information symbols $X_m[k]$ for $k=0, 1, \ldots, N-1$ to produce the time-domain samples $x_m[n]$ of the m-th OFDM symbol:

$$x_m[n] = \begin{cases} \frac{1}{N} \sum_{k=0}^{N-1} X_m[k] e^{j2\pi k(n-N_g)/N}, & \text{if } 0 \leq n \leq N + N_g - 1 \\ 0, & \text{otherwise,} \end{cases} \quad (1)$$

where $N$ and $N_g$ are the numbers of data samples and cyclic prefix samples, respectively.

The OFDM symbol $x_m[n]$ is transmitted through a channel $h_m[n]$ and is corrupted by Gaussian noise $\tilde{z}_m[n]$. The channel $h_m[n]$ is assumed to be block-stationary, i.e., time-invariant during each OFDM symbol. With this assumption, the output $\tilde{y}_m[n]$ of the channel can be found using a convolution operation as follows:

$$\tilde{y}_m[n] = h_m[n] * x_m[n] + \tilde{z}_m[n], \quad (2)$$

where $*$ denotes the convolution operation, i.e., $h_m[n] * x_m[n] = \sum_{r=-\infty}^{\infty} h_m[r] x_m[n-r]$, and $\tilde{z}_m[n]$ is additive white Gaussian noise with variance $\tau_{\tilde{z}}^2$.

When the receiver oscillator is not perfectly matched to the transmitter oscillator, there can be CFO $\Delta f = f_t - f_r$ between the transmitter carrier frequency $f_t$ and the receiver carrier frequency $f_r$. In addition, there may be a phase offset $\theta_0$ between the transmitter and the receiver carrier. The received symbol $y_m[n]$ is then $$y_m[n] = e^{j[2\pi \Delta f(n+m(N+N_g))T+\theta_0]}(h_m[n] * x_m[n] + \tilde{z}_m[n]), \quad (3)$$

where $T$ is the sampling period.

The frequency offset $\Delta f$ can be represented with respect to the subcarrier bandwidth $1/NT$ by defining the relative frequency offset $\epsilon$ as $$\varepsilon \triangleq \frac{\Delta f}{1/NT} = \Delta f NT \quad (4)$$

Using the relative frequency offset $\epsilon$, the received symbol $y_m[n]$ is expressed as $$y_m[n] = e^{j\frac{2\pi \varepsilon n}{N}} e^{j2\pi \varepsilon m(1+\alpha)} e^{j\theta_0}(h_m[n] * x_m[n]) + z_m[n], \quad (5)$$

where $$\alpha = \frac{N_g}{N}$$

and $$z_m[n] = e^{j\frac{2\pi \varepsilon n}{N}} e^{j2\pi \varepsilon m(1+\alpha)} e^{j\theta_0} \tilde{z}_m[n].$$

The noise $z_m[n]$ is a zero-mean complex-Gaussian random-variable with variance $\sigma_z^2 = \sigma_{\tilde{z}}^2$ and is independent of the transmit signal and the channel. To simplify the notation, $c_m[n]$ is defined as $$c_m[n] \triangleq \frac{1}{N} e^{j2\pi \varepsilon n/N} e^{j2\pi \varepsilon m(1+\alpha)} e^{j\theta_0}. \quad (6)$$

The received sample $y_m[n]$ is then $$y_m[n] = NC_m[n](h_m[n] * x_m[n]) + z_m[n] \quad (7)$$

At the receiver, the discrete Fourier transform (DFT) is performed on the received samples $y_m[n]$. The DFT of $y_m[n]$ in the presence of the carrier frequency offset $\epsilon$ for $$|\varepsilon| < \frac{1}{2}$$

is $$Y_m[k] = C_m[0]H_m[k]X_m[k] + I_m[k] + Z_m[k], \quad (8)$$

where $$I_m[k] = \sum_{r=1}^{N-1} C_m[r] X_m[k-r], \quad (9)$$

and $C_m[k]$, $H_m[k]$, and $Z_m[k]$ are the DFTs of $c_m[n]$, $h_m[n]$, and $z_m[n]$, respectively. Using (6), it can be shown that $$C_m[k] = \left( \frac{\sin(\pi(\varepsilon - k))}{N \sin(\pi(\varepsilon - k)/N)} e^{j\pi(\varepsilon-k)(1-1/N)} \right) \cdot e^{j[2\pi \varepsilon m(1+\alpha)+\theta_0]}. \quad (10)$$

In (9), it was assumed that $H_m[k]$ and $X_m[k]$ are periodic with period N to simplify the notation. When the frequency offset $\epsilon$ has a magnitude larger than ½, the frequency offset introduces a cyclic shift of $Y_m[k]$. However, it is assumed herein that $$|\varepsilon| < \frac{1}{2}.$$

When $$|\varepsilon| \geq \frac{1}{2},$$

other integer frequency offset correction algorithms can be employed.

The cyclic prefix-based (CPB) algorithm and the pilot tone-aided (PTA) algorithm are explained below. The CFO estimation algorithm according to the present invention overcomes the shortcomings of the CPB and the PTA algorithms. In one cyclic-prefix-based algorithm, the maximum-likelihood (ML) frequency offset estimator that uses the cyclic prefix samples was derived for the AWGN channel. The received sample $y_m[n]$ for the AWGN channel is $$y_m[n] = e^{j\frac{2\pi\varepsilon n}{N}} e^{j2\pi\varepsilon m(1+\alpha)} e^{j\theta_0} x_m[n] + z_m[n]. \tag{11}$$

If $x_m[n]$ is a cyclic prefix sample, $x_m[n+N]$ is exactly the same as $x_m[n]$. Then it can be easily seen that $y_m^*[n]y_m[n+N]$ is approximately equal to $e^{j2\pi\varepsilon}|x_m[n]|^2$ for low noise levels. As used herein, the "*" is used to signify a complex conjugate. For example, $y^*_m[n]$ is a complex conjugate of $y_m[n]$. Thus, by measuring the phase of $y_m^*[n]y_m[n+N]$, the frequency offset can be estimated. The following estimator was formally derived and shown to be the ML estimator for the AWGN channel:

$$\hat{\varepsilon}_{CPB} = \frac{1}{2\pi} \angle \left( \sum_{n=0}^{N_g-1} y_m^*[n] y_m[n+N] \right). \tag{12}$$

Although the ML estimator performs well for the AWGN channel, its performance in frequency selective channels is not satisfactory. Moreover, the performance of this estimator degrades if there is an error in the symbol timing estimation.

In a pilot-tone-aided (PTA) algorithm, the CPB CFO estimator in (12) uses the time-domain samples $y_m[n]$, whereas the PTA CFO estimator uses the DFT value, $Y_m[k]$, of the time-domain samples. The PTA CFO was developed based on the observation that a channel at each subcarrier does not change significantly over two consecutive OFDM symbols. Multiplying $Y_{m-1}^*[k]$ by $Y_m[k]$ results in $$Y_{m-1}^*[k]Y_m[k] = \tag{13}$$
$$e^{j2\pi\varepsilon(1+\alpha)}|C_{m-1}^*[0]C_m[0]|H_{m-1}^*[k]H_m[k] \cdot X_{m-1}^*[k]X_m[k] +$$
$$I'_m[k] + Z'_m[k],$$

where the inter-carrier interference (ICI) $I'_m[k]$ is $$I'_m[k] = C_{m-1}^*[0]H_{m-1}^*[k]X_{m-1}^*[k]I_m[k]$$
$$+ C_m[0]H_m[k]X_m[k]I_{m-1}^*[k]$$
$$+ I_{m-1}^*[k]I_m[k], \tag{14}$$

and the noise $Z'_m[k]$ is $$Z'_m[k] = (Y_{m-1}[k] - Z_{m-1}[k])^*Z_m[k]$$
$$+ (Y_m[k] - Z_m[k])Z_{m-1}^*[k] + Z_{m-1}^*[k]Z_m[k]. \tag{15}$$

In (13), the fact that the phase of $C_{m-1}^*[0]C_m[0]$ is equal to $2\pi\varepsilon(1+\alpha)$ was used, which can be shown from (10). From (13), it can be seen that the phase of $Y_{m-1}^*[k]Y_m[k]$ is approximately equal to the phase of $X_{m-1}^*[k]X_m[k]$ plus $2\pi\varepsilon$ $(1+\alpha)$ if the phase of the channel does not change substantially over two OFDM symbols, i.e., $\angle H_m[k] \approx \angle H_{m-1}[k]$ for all m. Since the transmit symbols $X_{m-1}^*[k]$ and $X_m[k]$ are known to the receiver for pilot subcarriers, the receiver can estimate the frequency offset $\varepsilon$ by measuring the phase of $Y_{m-1}^*[k]Y_m[k]X_{m-1}[k]X_m^*[k]$. The PTA CFO estimator can be expressed as follows:

$$\hat{\varepsilon}_{PTA} = \frac{1}{2\pi(1+\alpha)} \angle \left( \sum_{k \in P} X_{m-1}[k]X_m^*[k]Y_{m-1}^*[k]Y_m[k] \right), \tag{16}$$

where P is the set of pilot subcarriers. This PTA CFO estimator was shown to perform well in frequency selective channels. Although this estimator performs well, no optimality is associated with this estimator unlike the CPB estimator. The PTA CFO estimator can be shown to be optimal in the maximum-likelihood sense if $I_m[k]$ is Gaussian and independent from $I_m[l]$ for $l \neq k$. However, $I_m[k]$ is not independent from $I_m[l]$ for $l \neq k$.

Although the PTA CFO estimator described above performs well in frequency selective channels, it requires pilot subcarriers, which occupy valuable bandwidth. The pilot subcarriers can be removed by using the M-th power method when M-ary phase shift keying (PSK) or amplitude phase shift keying (APSK) is used for modulation of each subcarrier. Since $(X_{m-1}^*[k]X_m[k])^M = 1$ for M-ary PSK or APSK, the phase of $(Y_{m-1}^*[k]Y_m[k])^M$ is approximately equal to $2\pi M\varepsilon$ $(1+\alpha)$ for low noise and ICI. Thus, the following estimator can be developed:

$$\hat{\varepsilon} = \frac{1}{2\pi M(1+\alpha)} \angle \left( \sum_{k=0}^{N-1} \frac{(Y_{m-1}^*[k]Y_m[k])^M}{|Y_{m-1}^*[k]Y_m[k]|^\lambda} \right), \tag{17}$$

where $$0 \leq \lambda \leq M. \tag{18}$$

The denominator in (17) normalizes the magnitude of $(Y_{m-1}^*[k]Y_m[k])^M$ without altering the phase of $(Y_{m-1}^*[k]Y_m[k])^M$ before summing $(Y_{m-1}^*[k]Y_m[k])^M$ over all subcarriers. Although the similarity of (17) with (16) implies that $\lambda$ should be M−1, it is not easy to show what value $\lambda$ should take for the best performance of the blind estimator. Thus, the performance of the estimator for different $\lambda$ is shown by simulation in the next section.

Because of the ambiguity in the phase measurement, the blind CFO estimator performs well only when $$|\varepsilon| < \varepsilon_{max} \overset{\Delta}{=} \frac{1}{2M(1+\alpha)}.$$

For example, for quadrature phase shift keying (QPSK), $\varepsilon_{max}$ is approximately 0.12 for $\alpha = 0.05$. Theoretically, the acquisition range of the blind estimator is M times smaller than that of the PTA estimator. However, in practice, the acquisition range of the PTA estimator is also limited by the ICI caused by the CFO because the ICI is significant for large values of $\varepsilon$.

Thus, the acquisition range of the blind CFO estimator is larger than $$\frac{1}{M}$$

times of that of the PTA estimator. Although the acquisition range of the blind CFO estimator is limited to $$\left(-\frac{1}{2M(1+\alpha)}, \frac{1}{2M(1+\alpha)}\right),$$

it does not pose a significant problem for small M if the blind CFO estimator is used for CFO tracking.

Unlike the CPB estimator, the performance of the blind CFO estimator depends on the magnitude of the CFO. The power of the ICI $I'_m[k]$ is a monotonically increasing function of the magnitude of the CFO. Thus, the performance of the blind CFO estimator is better for small frequency offsets than for large frequency offsets.

The performance of the blind CFO estimator can be improved by iterating the estimation and correction steps because the estimator has improved performance for small frequency offsets. Once the CFO is estimated using the estimator (17), the CFO can be corrected in the time domain by multiplying the received signal $y_m[n]$ with $e^{-j2\pi\hat{\epsilon}n/N}$. If $|\epsilon-\hat{\epsilon}|$ is smaller than $|\epsilon|$, then the residual frequency offset $\epsilon-\hat{\epsilon}$ causes less ICI than the original frequency offset E. Because of this reduced ICI, the estimate of the residual frequency offset will become even more accurate if the residual CFO is estimated again with (17). The iteration may be performed on the same received signal or a subsequent received signal. Thus, increasingly accurate frequency offset estimation and correction can be achieved by iterating the estimation and correction steps.

Since the averaging operation improves the performance of the estimators, the proposed estimator has an advantage over the ML estimator. Moreover, the proposed estimator is not affected significantly by the frequency selectivity of the channel. On the other hand, the ML estimator is adversely affected by the channel frequency selectivity.

The performance of the blind CFO estimator is evaluated below by simulation and is compared to the performance of the CPB estimator and the PTA estimator. The simulation parameters were chosen as follows. The number of data samples, N, is 1024, and the number of cyclic prefix samples, $N_g$, is 56, resulting in $\alpha=7/128$. The frequency offset $\epsilon$ is assumed to be uniformly distributed between -0.1 and 0.1. The channel used in this section is either the AWGN channel or a multipath channel with an exponentially decaying power-delay profile. For the multipath channel, it was assumed that the channel is stationary over two OFDM symbols, but the root-mean square (rms) delay spread was chosen to be $$\frac{1}{8}N_g$$

in terms of the number of samples.

Figure 2:
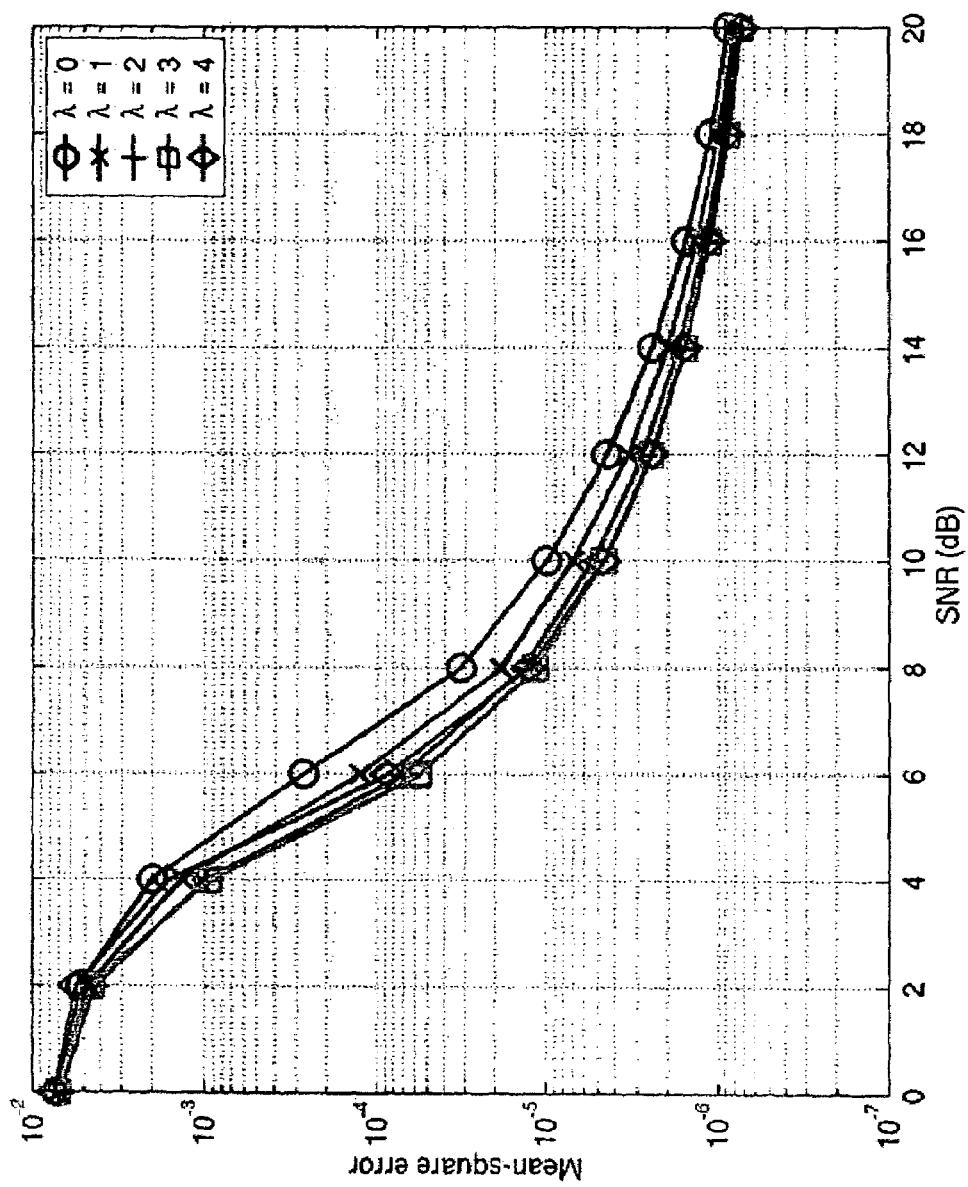
FIG. 2 is a graph of mean-square error (MSE) of a blind CFO estimation algorithm for the AWGN channel with different values of λ in (17) when QPSK is employed.

Referring now to FIG. 2, the mean-square error (MSE) of the blind CFO estimator for the AWGN channel is shown for different values of $\lambda$ in (17) when QPSK is employed for each subcarrier. Although the performance of the blind CFO estimator is not very sensitive to the values of $\lambda$, the best performance can be achieved with $\lambda=M-1=3$.

Figure 3:
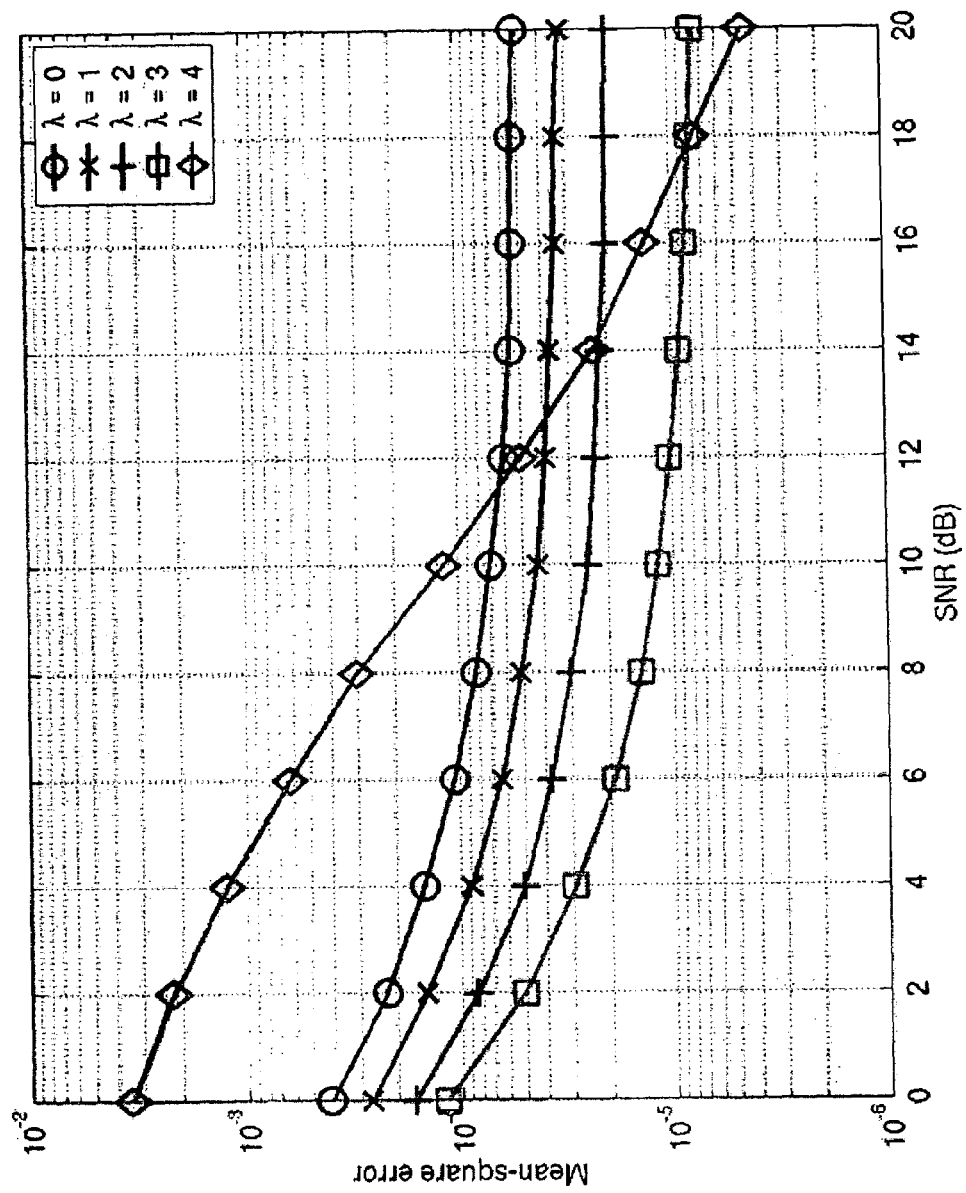
FIG. 3 is a graph of MSE of the blind CFO estimation algorithm for a multipath channel with different values of λ in (17) when QPSK is employed.

Referring now to FIG. 3, the MSE of the blind CFO estimator is shown for the multipath channel described earlier. In this case, the value of $\lambda$ significantly affects the performance of the blind CFO estimator. As in the case of the AWGN channel, the performance of the blind CFO estimator is best when $\lambda$ is equal to 3, although $\lambda=4$ results in better performance than $\lambda=3$ for high SNR. The fact that the estimator with $\lambda=4$ performs better than $\lambda=3$ for high SNR can be explained by noting that the ICI is dominant rather than the noise for high SNR.

Figure 4:
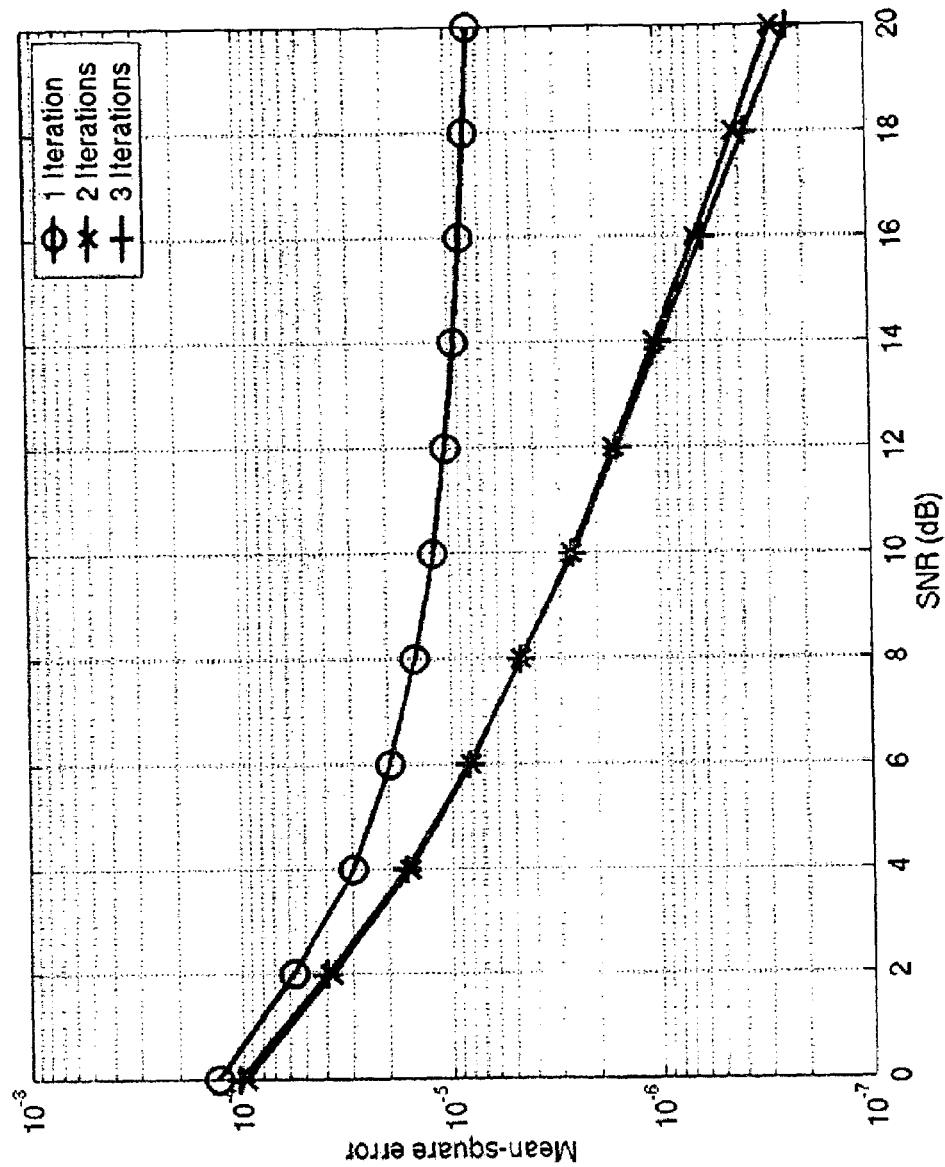
FIG. 4 is a graph of MSE of the blind CFO estimation algorithm with different number of iterations of the estimation and correction steps.

Referring now to FIG. 4, the MSE of the blind CFO estimator is shown for a different number of iterations for the estimation and correction steps with $\lambda=M-1=3$. By iterating the estimation and correction steps twice, the performance of the blind CFO estimator improves as is shown. However, additional iteration does not improve the performance significantly. This can be explained by the fact that the correction step reduces only the ICI, not the noise. In other words, the convergence shown in FIG. 4 occurs because of the background noise that cannot be reduced.

Figure 5:
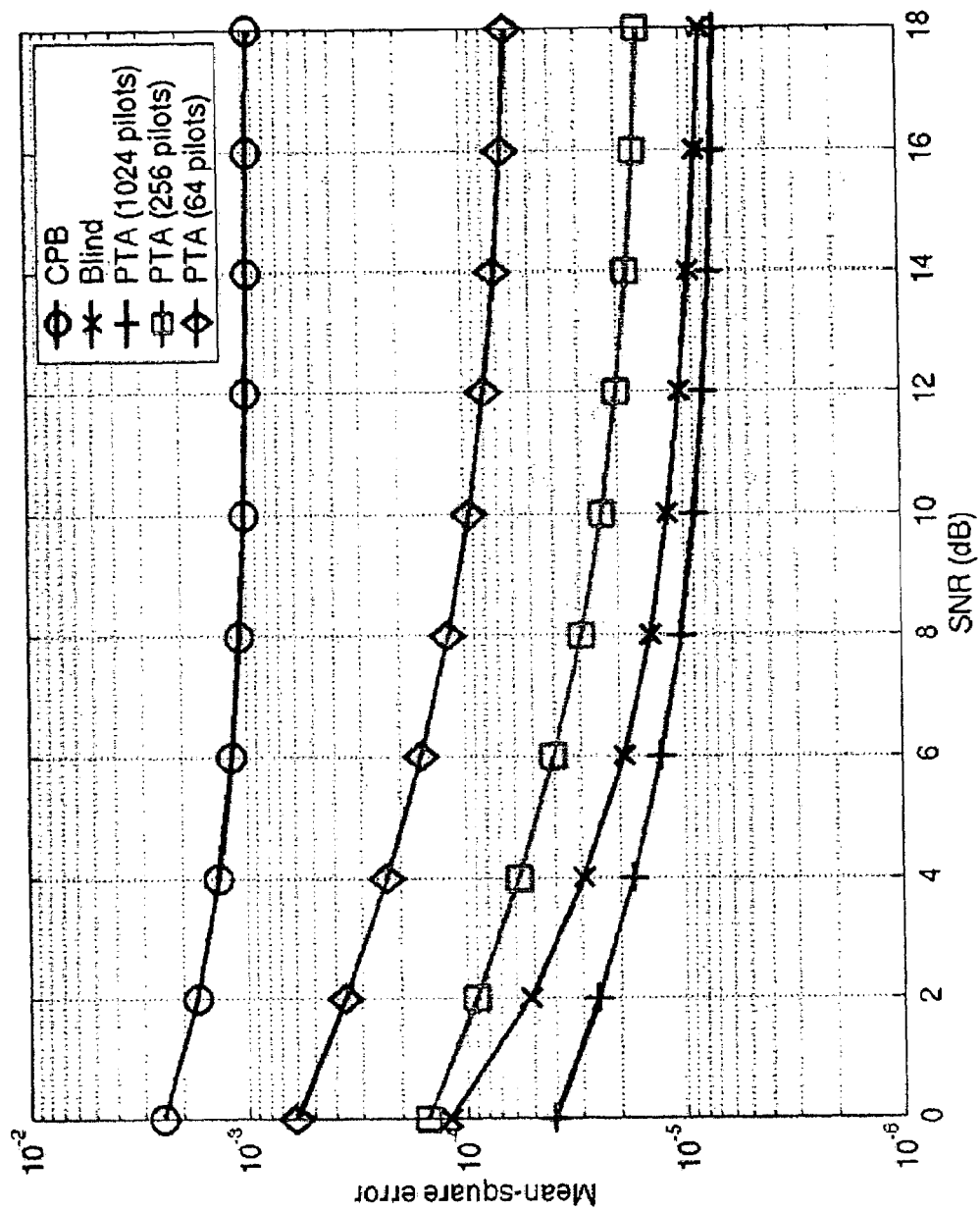
FIG. 5 is a graph of mean-square error of the cyclic prefix-based (CPB), pilot tone-aided (PTA), and blind algorithms.
Figure 6:
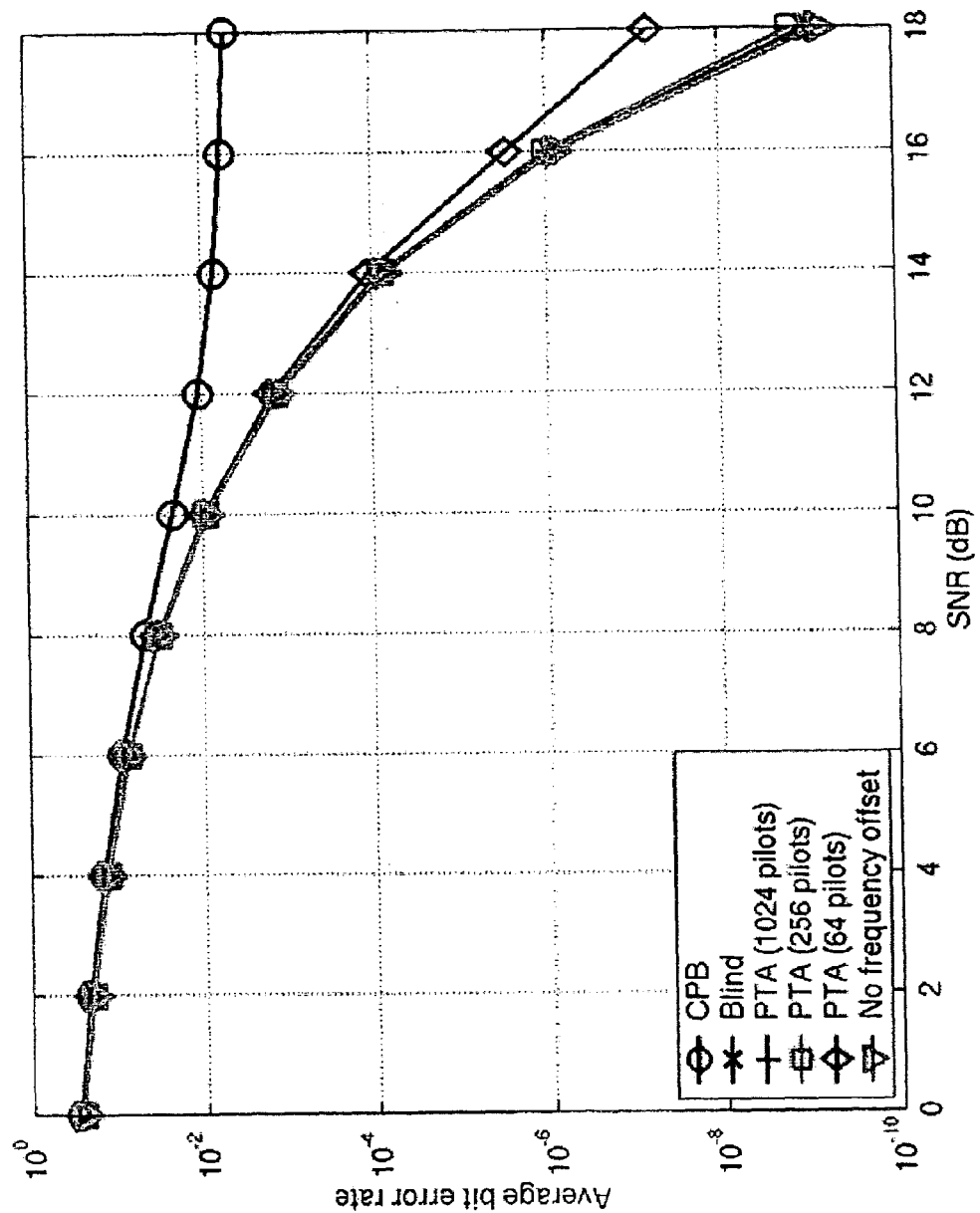
FIG. 6 is a graph of average bit error rate for four-phase time-domain differential modulation with the CFO corrected by the cyclic prefix-based (CPB), pilot tone-aided (PTA), and blind algorithms and a reference BER curve in the absence of the CFO.

Referring now to FIGS. 5 and 6, the performance of the blind CFO estimator is compared to that of the CPB and PTA CFO estimators. Here, for fair comparison, the blind CFO estimator estimates the CFO only once rather than iterating the estimation and correction multiple times. The MSEs of the blind, CPB, and PTA estimators are shown in FIG. 5. In case of the PTA CFO estimator, the MSE for 1024, 256, and 64 pilot subcarriers were plotted. The 1024, 256, and 64 pilot subcarriers occupy 100%, 25%, and 6.25% of the bandwidth, respectively. As can be seen, the CPB CFO estimator suffers from the frequency selectivity of the channel. The blind CFO estimator does not perform as well as the PTA CFO estimator with 1024 pilot subcarriers but outperforms the PTA estimator with 256 and 64 subcarriers. This means that at least 25% of the bandwidth can be saved by choosing the blind CFO estimator instead of the PTA CFO estimator.

Referring now to FIG. 6, a plot of the BER for time-domain differential demodulation with differential QPSK (DQPSK) is shown. As can be seen, the blind CFO estimator is able to follow the BER curve of the systems without frequency offset, whereas the other estimators suffer from performance degradation except for the PTA CFO estimator with 100% pilot subcarriers.

The blind CFO estimator according to the present invention is suitable for OFDM transmission over multipath channels. In contrast to the CPB CFO estimator, the blind CFO estimator does not suffer from the frequency selectivity of a channel. Unlike the PTA CFO estimator, the blind CFO estimator does not require any pilot tones. Although the acquisition range of the blind CFO estimator is limited to small frequency offsets, it can be used for carrier frequency tracking. The performance of the blind CFO estimator was evaluated by simulation: it outperforms the CPB CFO estimator and the PTA CFO estimator even when the pilot subcarriers occupy 25% of the total subcarriers. Finally, the performance of the blind CFO estimator can be improved by iterating the estimation and correction steps since the blind CFO estimator performs better for small frequency offsets.

Figure 7:
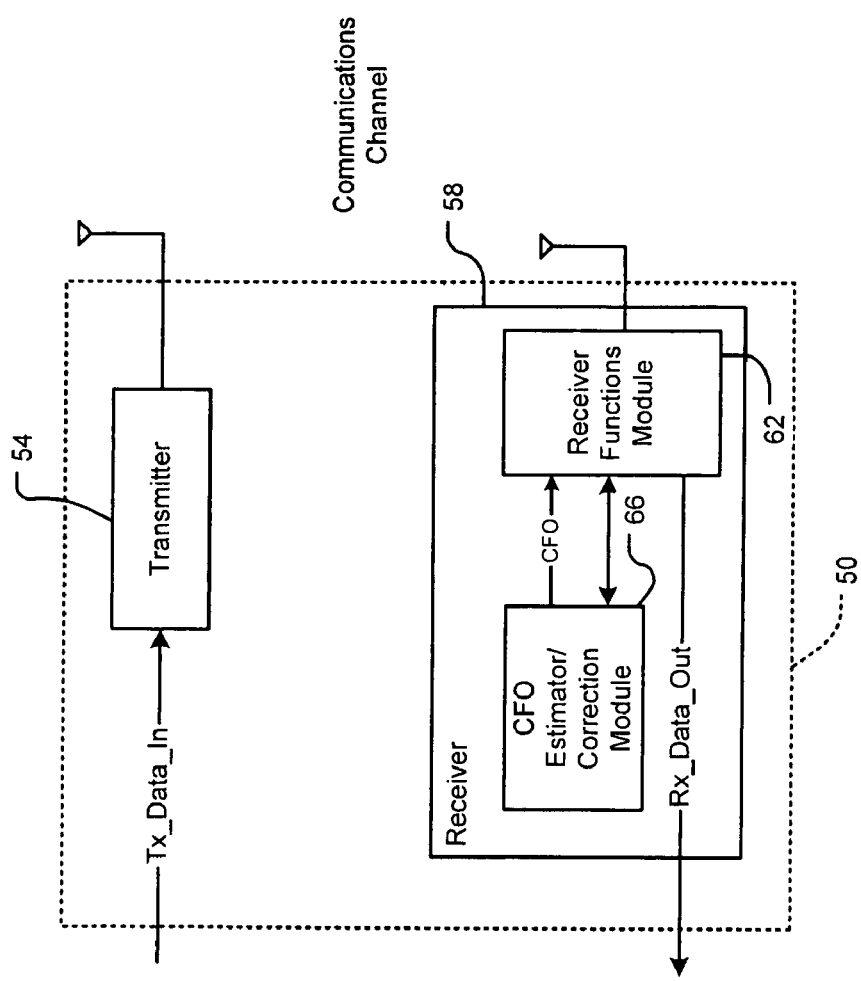
FIG. 7 is a functional block diagram of an exemplary receiver that estimates CFO and generates a CFO correction.

Referring now to FIG. 7, a transceiver 50 according to the present invention is shown to include a transmitter 54 and a receiver 58. The transmitter 54 receives data, performs coding, multiplexing and/or other transmitter functions and outputs the data to a communications channel as shown. While a wireless application is shown, skilled artisans will appreciate that OFDM also may be used for wired applications. The receiver 58 includes a receiver functions module 62 that performs receiver functions such as decoding, demultiplexing and other receiver functions and outputs received data as shown.

A CFO estimator module 66 communicates with the receiver functions module 62. The CFO estimator estimates CFO based on the CFO estimation described above and below. In some embodiments, the estimation is blind and/or an iterative approach is used. In other embodiments, pilot subcarriers are used, pilot subcarriers with known pilot symbols and/or a single iteration is performed. A CFO correction module 70 receives the CFO and corrects the received signal. In some embodiments, the received signal in the time domain $y_m[n]$ is multiplied by $e^{-j2\pi\hat{\epsilon}n/N}$.

Figure 8:
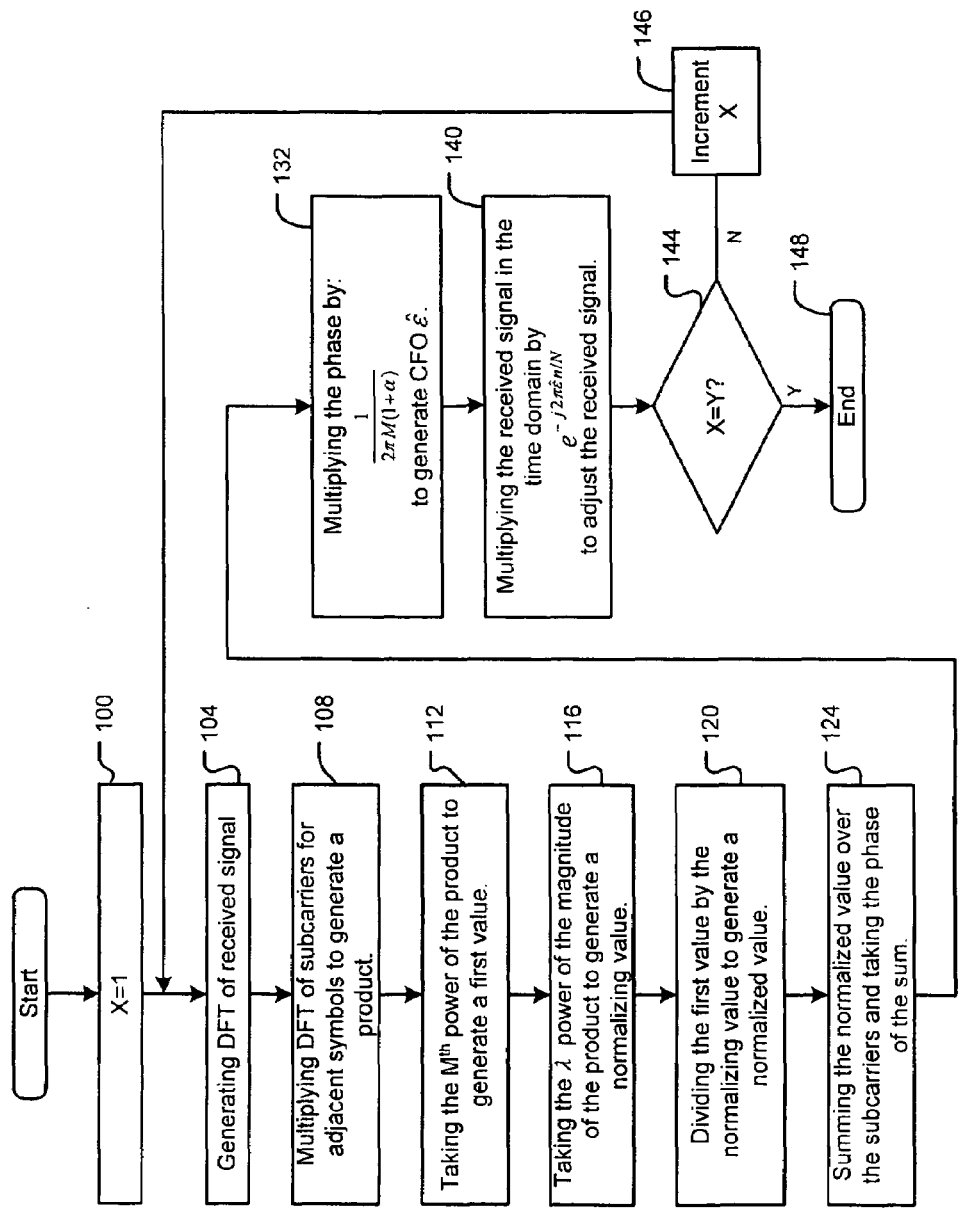
FIG. 8 is a flowchart illustrating exemplary steps that are performed by the receiver in FIG. 7.

Referring now to FIG. 8, steps performed by the blind CFO estimator and correction modules are shown. In step 100, X is set equal to 1. In step 104, the DFT of received signals for adjacent symbols is performed. In step 108, the DFT of subcarriers for adjacent symbols is multiplied to generate a product. In step 112, the $M^{th}$ power of the product is calculated to generate a first value. In step 116, the $\lambda^{th}$ power of the magnitude of the product is calculated to generate a normalizing value. In step 120, the first value is divided by the normalizing value to generate a normalized value. In step 124, the normalized values are summed over all of the subcarriers and the phase of the sum is determined. In step 132, the phase is multiplied by $$\frac{1}{2\pi M(1+\alpha)}$$

to generate the CFO $\hat{\epsilon}$.

CFO correction can then be performed. In step 140, the received signal in the time domain $y_m[n]$ is multiplied by $e^{-j2\pi\hat{\epsilon}n/N}$ to adjust the received signal $\hat{\epsilon}$. In step 144, control determines whether X=Y, where Y is the number of iterations to be performed. Y can be set equal to any integer, although diminishing improvement may occur as Y increases. In some embodiments, Y=2. If step 144 is false, X is incremented in step 146 and control returns to step 104. Otherwise, control ends in step 148. Steps 100, 144 and 146 can be omitted if a single iteration is to be performed.

In some implementations, the CFO is used to adjust a digital clock in the system that generates the carrier frequency rather than adjusting the analog system clock. The coarse estimate can be generated by another algorithm such as the CPB algorithm, although other algorithms can be used.

The previous description related to a blind carrier frequency tracking algorithm and demonstrated that the blind algorithm works very well in the absence of the pilots. It was shown by simulation that the blind algorithm outperforms the pilot-tone aided (PTA) algorithm, which that requires the pilot subcarriers, when the number of pilot subcarriers is less than 25% of the total subcarriers. However, many of the current systems already have pilot subcarriers. For example, HD radio and digital video broadcasting (DVB) systems employ pilot subcarriers. The blind algorithm can be modified according to the present invention for systems with pilot subcarriers.

In some implementations according to the invention, the pilot subcarriers are treated in the same way as data subcarriers. Thus, the estimator becomes:

$$\hat{\epsilon} = \frac{1}{2\pi M(1+\alpha)} \angle \left( \sum_{k \in P \cup D} \frac{(Y^*_{m-1}[k]Y_m[k])^M}{|Y^*_{m-1}[k]Y_m[k]|^\lambda} \right),$$

where D is a set of data subcarrier indices and P is a set of pilot subcarrier indices. However, this estimator does not exploit the fact that the pilot subcarriers contain known symbols.

An improved estimator according to some implementations of the present invention that uses the known pilot symbols is:

$$\hat{\epsilon} = \frac{1}{2\pi M(1+\alpha)} \angle \left\{ \sum_{k \in D} \frac{(Y^*_{m-1}[k]Y_m[k])^M}{|Y^*_{m-1}[k]Y_m[k]|^\lambda} + \frac{\left( \sum_{k \in P} X_{m-1}[k]X^*_m[k]Y^*_{m-1}[k]Y_m[k] \right)^M}{\left| \sum_{k \in P} X_{m-1}[k]X^*_m[k]Y^*_{m-1}[k]Y_m[k] \right|^\lambda} \right\}$$

Usually, taking the M-th power increases the noise power. The first estimator takes the M-th power for each subcarrier and sums the M-th powered values, while the second estimator takes the M-th power after summing the values over all pilot subcarriers. Thus, the second estimator has smaller noise than the first estimator, which provides improved performance with respect to the first estimator.

As compared to the existing PTA estimator described above, the acquisition range of the above two estimators can be smaller. However, the MSE of this estimator will be much smaller than the PTA estimator. Thus, depending on the applications, the proposed estimators can be more useful than the PTA estimator.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system comprising:
   a receiver module that generates a receiver carrier frequency and that demodulates an orthogonal frequency division multiplexing (OFDM) signal using said receiver carrier frequency; and
   a CFO estimator module that communicates with said receiver module and that generates a carrier frequency offset (CFO) estimate of said OFDM signal using a method that includes an exponential product based on adjacent symbols and a normalized magnitude,
   wherein said CFO estimator module generates said CFO estimate based on $$\hat{\varepsilon} = \frac{1}{2\pi M(1+\alpha)} \sqrt[L]{\left( \sum_{k=0}^{N-1} \frac{(Y_{m-1}^*[k]Y_m[k])^M}{|Y_{m-1}^*[k]Y_m[k]|^\lambda} \right)},$$

wherein M is a number of phases, λ is a normalizing power, N is a number of data samples, α is a ratio of a number of cyclic prefix samples divided by N, m is a symbol index, and $Y_{m-1}^*[k]Y_m[k]$ are adjacent received symbols.

2. The system of claim 1 wherein said OFDM signal contains pilot subcarriers.

3. The system of claim 2 wherein said pilot subcarriers contain known pilot symbols.

4. The system of claim 1 wherein said receiver module operates in a frequency-selective channel.

5. The system of claim 1 wherein said receiver module operates in an additive white Gaussian noise (AWGN) channel.

6. The system of claim 1 wherein said receiver module operates in a multi-path fading channel.

7. The system of claim 1 wherein said receiver module is a wired receiver.

8. The system of claim 1 wherein said receiver module is a wireless receiver.

9. The system of claim 1 wherein said receiver module performs demodulation using amplitude phase shift keying (APSK).

10. The system of claim 1 wherein said receiver module performs demodulation using M-ary phase shift keying (MPSK).

11. The system of claim 1 wherein said CFO estimator module generates a first CFO estimate$_{\hat{\varepsilon}\_1}$, multiplies a time domain signal by $e^{-j2\pi\hat{\varepsilon}\_1 n/N}$ to generate an adjusted time domain signal, and uses the adjusted time domain signal to generate a second CFO estimate estimate$_{\hat{\varepsilon}\_2}$, where n and N are integers.

12. The system of claim 11 wherein said CFO estimator module multiplies said adjusted time domain signal by $e^{-j2\pi\hat{\varepsilon}\_2 n/N}$ to generate a second adjusted time domain signal, and uses the second adjusted time domain signal to generate a third CFO estimate$_{\hat{\varepsilon}\_3}$.

13. The system of claim 1 wherein 0≦λ≦M.

14. A system comprising:
receiver means for generating a receiver carrier frequency and for demodulating an orthogonal frequency division multiplexing (OFDM) signal using said receiver carrier frequency; and
estimator means, that communicates with said receiver means, for generating a carrier frequency offset (CFO) estimate of said OFDM signal using a method that includes an exponential product based on adjacent symbols and a normalized magnitude,
wherein said estimator means generates said CFO estimate based on $$\hat{\varepsilon} = \frac{1}{2\pi M(1+\alpha)} \sqrt[L]{\left( \sum_{k=0}^{N-1} \frac{(Y_{m-1}^*[k]Y_m[k])^M}{|Y_{m-1}^*[k]Y_m[k]|^\lambda} \right)},$$

wherein M is a number of phases, λ is a normalizing power, N is a number of data samples, α is a ratio of a number of cyclic prefix samples divided by N, m is a symbol index, and $Y_{m-1}^*[k]Y_m[k]$ are adjacent received symbols.

15. The system of claim 14 wherein said OFDM signal contains pilot subcarriers.

16. The system of claim 14 wherein said pilot subcarriers contain known pilot symbols.

17. The system of claim 14 wherein said receiver means operates in a frequency-selective channel.

18. The system of claim 14 wherein said receiver means operates in an additive white Gaussian noise (AWGN) channel.

19. The system of claim 14 wherein said receiver means operates in a multi-path fading channel.

20. The system of claim 14 wherein said receiver means is a wired receiver.

21. The system of claim 14 wherein said receiver means is a wireless receiver.

22. The system of claim 14 wherein said receiver means performs demodulation using amplitude phase shift keying (APSK).

23. The system of claim 14 wherein said receiver means performs demodulation using M-ary phase shift keying (MPSK).

24. The system of claim 14 wherein said estimator means generates a first CFO estimate$_{\hat{\varepsilon}\_1}$, multiplies a time domain signal by $e^{-j2\pi\hat{\varepsilon}\_1 n/N}$ to generate an adjusted time domain signal, and uses the adjusted time domain signal to generate a second CFO estimate $\hat{\varepsilon}\_2$, where n and N are integers.

25. The system of claim 24 wherein said estimator means multiplies said adjusted time domain signal by $$e^{-j2\pi\hat{\varepsilon}\_2 n/N}$$

to generate a second adjusted time domain signal, and uses the second adjusted time domain signal to generate a third CFO estimate $\hat{\varepsilon}\_3$.

26. The system of claim 14 wherein $0 \leq \lambda \leq M$.

27. A method comprising:
generating a receiver carrier frequency;
demodulating an orthogonal frequency division multiplexing (OFDM) signal using said receiver carrier frequency in a receiver;
generating a carrier frequency offset (CFO) estimate of said OFDM signal using a method that includes an exponential product based on adjacent symbols and a normalized magnitude,
where generating said CFO estimate is based on $$\hat{\varepsilon} = \frac{1}{2\pi M(1+\alpha)} \angle \left( \sum_{k=0}^{N-1} \frac{(Y_{m-1}^*[k]Y_m[k])^M}{|Y_{m-1}^*[k]Y_m[k]|^\lambda} \right),$$

wherein M is a number of phases, $\lambda$ is a normalizing power, N is a number of data samples, $\alpha$ is a ratio of a number of cyclic prefix samples divided by N, m is a symbol index, and $Y_{m-1}^*[k]Y_m[k]$ are adjacent received symbols.

28. The system of claim 27 wherein said OFDM signal contains pilot subcarriers.

29. The system of claim 27 wherein said pilot subcarriers contain known pilot symbols.

30. The method of claim 27 further comprising operating in a frequency-selective channel.

31. The method of claim 27 further comprising operating in an additive white Gaussian noise (AWGN) channel.

32. The method of claim 27 further comprising operating in a multi-path fading channel.

33. The method of claim 27 further comprising performing demodulation using amplitude phase shift keying (APSK).

34. The method of claim 27 further comprising performing demodulation using M-ary phase shift keying (MPSK).

35. The method of claim 27 further comprising:
generating a first CFO estimate $\hat{\varepsilon}\_1$;

multiplying a time domain signal by $$e^{-j2\pi\hat{\varepsilon}\_1 n/N}$$

to generate an adjusted time domain signal, where n and N are integers; and
using the adjusted time domain signal to generate a second CFO estimate $\hat{\varepsilon}\_2$.

36. The method of claim 35 further comprising:
multiplying said adjusted time domain signal by $$e^{-j2\pi\hat{\varepsilon}\_2 n/N}$$

to generate a second adjusted time domain signal; and
using the second adjusted time domain signal to generate a third CFO estimate $\hat{\varepsilon}\_3$.

37. The method of claim 27 wherein $0 \leq \lambda \leq M$.

38. A system comprising:
a receiver module that generates a receiver carrier frequency and that demodulates an orthogonal frequency division multiplexing (OFDM) signal using said receiver carrier frequency; and
a CFO estimator module that communicates with said receiver module and that estimates carrier frequency offset (CFO) of said OFDM signal using a method that includes an exponential product based on adjacent symbols and a normalized magnitude,
wherein said OFDM signal contains pilot subcarriers, and
wherein said CFO estimator module estimates said CFO based on:

$$\hat{\varepsilon} = \frac{1}{2\pi M(1+\alpha)} \angle \left\{ \sum_{k \in D} \frac{(Y_{m-1}^*[k]Y_m[k])^M}{|Y_{m-1}^*[k]Y_m[k]|^\lambda} + \frac{\left(\sum_{k \in P} X_{m-1}[k]X_m^*[k]Y_{m-1}^*[k]Y_m[k]\right)^M}{\left|\sum_{k \in P} X_{m-1}[k]X_m^*[k]Y_{m-1}^*[k]Y_m[k]\right|^\lambda} \right\}$$

wherein M is a number of phases, λ is a normalizing power, N is a number of data samples, α is a ratio of a number of cyclic prefix samples divided by N, m is a symbol index, $Y_{m-1}^*[k]$ $Y_m[k]$ are adjacent received symbols, $X_{m-1}^*[k]X_m[k]$ are pilot subcarriers, D is a set of data subcarrier indices, and P is a set of pilot subcarrier indices.

39. The system of claim 38 wherein said pilot subcarriers contain known pilot symbols.

40. The system of claim 38 wherein said receiver module operates in a frequency-selective channel.

41. The system of claim 38 wherein said receiver module operates in an additive white Gaussian noise (AWGN) channel.

42. The system of claim 38 wherein said receiver module operates in a multi-path fading channel.

43. The system of claim 38 wherein said receiver module is a wired receiver.

44. The system of claim 38 wherein said receiver module is a wireless receiver.

45. The system of claim 38 wherein said receiver module performs demodulation using amplitude phase shift keying (APSK).

46. The system of claim 38 wherein said receiver module performs demodulation using M-ary phase shift keying (MPSK).

47. The system of claim 38 wherein said CFO estimator module generates a first CFO $$\text{estimate}_{\hat{\varepsilon}\_1},$$

multiplies a time domain signal by $$e^{-j2\pi\hat{\varepsilon}\_1 n/N}$$

to generate an adjusted time domain signal, and uses the adjusted time domain signal to generate a second CFO $$\text{estimate}_{\hat{\varepsilon}\_2},$$

where n and N are integers.

48. The system of claim 47 wherein said CFO estimator module multiplies said adjusted time domain signal by $$e^{-j2\pi\hat{\varepsilon}\_2 n/N}$$

to generate a second adjusted time domain signal, and uses the second adjusted time domain signal to generate a third CFO $$\text{estimate } \hat{\varepsilon}\_3.$$

49. The system of claim 38 wherein $0 \leq \lambda \leq M$.

50. A system comprising:
receiver means for generating a receiver carrier frequency and for demodulating an orthogonal frequency division multiplexing (OFDM) signal using said receiver carrier frequency; and estimator means, that communicates with said receiver means, for generating a carrier frequency offset (CFO) estimate of said OFDM signal using a method that includes an exponential product based on adjacent symbols and a normalized magnitude, wherein said OFDM signal contains pilot subcarriers, and wherein said estimator means generates said CFO estimate based on:

$$\hat{\varepsilon} = \frac{1}{2\pi M(1+\alpha)} \angle \left\{ \sum_{k \in D} \frac{(Y_{m-1}^*[k]Y_m[k])^M}{|Y_{m-1}^*[k]Y_m[k]|^\lambda} + \frac{\left(\sum_{k \in P} X_{m-1}[k]X_m^*[k]Y_{m-1}^*[k]Y_m[k]\right)^M}{\left|\sum_{k \in P} X_{m-1}[k]X_m^*[k]Y_{m-1}^*[k]Y_m[k]\right|^\lambda} \right\}$$

wherein M is a number of phases, λ is a normalizing power, N is a number of data samples, α is a ratio of a number of cyclic prefix samples divided by N, m is a symbol index, $Y_{m-1}^*[k]$ $Y_m[k]$ are adjacent received symbols, $X_{m-1}^*[k]X_m[k]$ are pilot subcarriers, D is a set of data subcarrier indices, and P is a set of pilot subcarrier indices.

51. The system of claim 50 wherein said pilot subcarriers contain known pilot symbols.

52. The system of claim 50 wherein said receiver means operates in a frequency-selective channel.

53. The system of claim 50 wherein said receiver means operates in an additive white Gaussian noise (AWGN) channel.

54. The system of claim 50 wherein said receiver means operates in a multi-path fading channel.

55. The system of claim 50 wherein said receiver means is a wired receiver.

56. The system of claim 50 wherein said receiver means is a wireless receiver.

57. The system of claim 50 wherein said receiver means performs demodulation using amplitude phase shift keying (APSK).

58. The system of claim 50 wherein said receiver means performs demodulation using M-ary phase shift keying (MPSK).

59. The system of claim 50 wherein said estimator means generates a first CFO $$\text{estimate}_{\hat{\varepsilon}\_1},$$

multiplies a time domain signal by $$e^{-j2\pi\hat{\varepsilon}\_1 n/N}$$

to generate an adjusted time domain signal, and uses the adjusted time domain signal to generate a second CFO estimate $\hat{\varepsilon}\_2$, where n and N are integers.

60. The system of claim 59 wherein said estimator means multiplies said adjusted time domain signal by $$e^{-j2\pi\hat{\varepsilon}\_2 n/N}$$

to generate a second adjusted time domain signal, and uses the second adjusted time domain signal to generate a third CFO estimate $\hat{\varepsilon}\_3$.

61. The system of claim 50 wherein $0 \leq \lambda \leq M$.
62. A method comprising:
  generating a receiver carrier frequency;
  demodulating an orthogonal frequency division multiplexing (OFDM) signal using said receiver carrier frequency in a receiver; and
  estimating carrier frequency offset (CFO) of said OFDM signal using a method that includes an exponential product based on adjacent symbols and a normalized magnitude,
  wherein estimating said CFO is based on:

$$\hat{\varepsilon} = \frac{1}{2\pi M(1+\alpha)} \angle \left( \sum_{k \in D} \frac{(Y^*_{m-1}[k]Y_m[k])^M}{|Y^*_{m-1}[k]Y_m[k]|^\lambda} + \frac{\left(\sum_{k \in P} X_{m-1}[k]X^*_m[k]Y^*_{m-1}[k]Y_m[k]\right)^M}{\left|\sum_{k \in P} X_{m-1}[k]X^*_m[k]Y^*_{m-1}[k]Y_m[k]\right|^\lambda} \right)$$

wherein M is a number of phases, $\lambda$ is a normalizing power, N is a number of data samples, $\alpha$ is a ratio of a number of cyclic prefix samples divided by N, m is a symbol index, $Y_{m-1}^*[k]$ $Y_m[k]$ are adjacent received symbols $X_{m-1}^*[k]X_m[k]$ are pilot subcarriers, D is a set of data subcarrier indices, and P is a set of pilot subcarrier indices,
  wherein said OFDM signal contains pilot subcarriers.

63. The method of claim 62 wherein said pilot subcarriers contain known pilot symbols.

64. The method of claim 62 further comprising operating in a frequency-selective channel.
65. The method of claim 62 further comprising operating in an additive white Gaussian noise (AWGN) channel.
66. The method of claim 62 further comprising operating in a multi-path fading channel.
67. The method of claim 62 further comprising performing demodulation using amplitude phase shift keying (APSK).
68. The method of claim 62 further comprising performing demodulation using M-ary phase shift keying (MPSK).
69. The method of claim 62 further comprising:
  generating a first CFO estimate$_{\hat{\varepsilon}\_1}$;

multiplying a time domain signal by $$e^{-j2\pi\hat{\varepsilon}\_1 n/N}$$

to generate an adjusted time domain signal, where n and N are integers; and
  using the adjusted time domain signal to generate a second CFO estimate estimate $\hat{\varepsilon}\_2$.

70. The method of claim 69 further comprising:
  multiplying said adjusted time domain signal by $$e^{-j2\pi\hat{\varepsilon}\_2 n/N}$$

to generate a second adjusted time domain signal; and
  using the second adjusted time domain signal to generate a third CFO estimates estimate $\hat{\varepsilon}\_3$.

71. The method of claim 62 wherein $0 \leq \lambda \leq M$.
72. The system of claim 1 wherein said exponential product includes multiplication of a discrete Fourier transform of adjacent symbols of said OFDM signal.
73. The system of claim 1 wherein said CFO estimator generates said CFO estimate of said OFDM signal based on said exponential product and a normalized magnitude of that product.

* * * * *

UNITED STATES PATENT AND TRADEMARK OFFICE
CERTIFICATE OF CORRECTION

PATENT NO. : 7,515,657 B1  Page 1 of 1
APPLICATION NO. : 10/985860
DATED : April 7, 2009
INVENTOR(S) : Jungwon Lee et al.

It is certified that error appears in the above-identified patent and that said Letters Patent is hereby corrected as shown below:

| | |
|---|---|
| Column 5, Line 23 | Insert -- . -- after "[n]" |
| Column 5, Line 30 | Delete "=" before the "[n]" |
| Column 5, Line 32 | Delete "$\tau$" and insert -- $\sigma$ -- |
| Column 6, Line 20 | Delete "NC" and insert -- Nc -- |
| Column 6, Line 22 | Insert -- . -- after "[n]" |
| Column 6, Line 53 | Insert -- . -- after "[k]" |
| Column 18, Line 23 | Delete the equation in the patent and insert |

$$-- \hat{\varepsilon} = \frac{1}{2\pi M(1+\alpha)} \angle \left( \sum_{k \in D}^{N-1} \frac{\left(Y_{m-1}^*[k]Y_m[k]\right)^M}{\left|Y_{m-1}^*[k]Y_m[k]\right|^{\lambda}} + \frac{\left(\sum_{k \in P}^{N-1} X_{m-1}[k]X_m^*[k]Y_{m-1}^*[k]Y_m[k]\right)^M}{\left|\sum_{k \in P}^{N-1} X_{m-1}[k]X_m^*[k]Y_{m-1}^*[k]Y_m[k]\right|^{\lambda}} \right) --$$

Column 19, Line 46   Delete the equation in the patent and insert $$-- \hat{\varepsilon} = \frac{1}{2\pi M(1+\alpha)} \angle \left( \sum_{k \in D}^{N-1} \frac{\left(Y_{m-1}^*[k]Y_m[k]\right)^M}{\left|Y_{m-1}^*[k]Y_m[k]\right|^{\lambda}} + \frac{\left(\sum_{k \in P}^{N-1} X_{m-1}[k]X_m^*[k]Y_{m-1}^*[k]Y_m[k]\right)^M}{\left|\sum_{k \in P}^{N-1} X_{m-1}[k]X_m^*[k]Y_{m-1}^*[k]Y_m[k]\right|^{\lambda}} \right) --$$

Signed and Sealed this

Third Day of November, 2009

David J. Kappos
*Director of the United States Patent and Trademark Office*